(12) United States Patent
Wakabayashi

(10) Patent No.: US 11,022,159 B2
(45) Date of Patent: Jun. 1, 2021

(54) ATTACHMENT DEVICE

(71) Applicant: HARDLOCK INDUSTRY CO., LTD., Osaka (JP)

(72) Inventor: Katsuhiko Wakabayashi, Osaka (JP)

(73) Assignee: Hardlock Industry Co., Ltd., Osaka (JP)

( * ) Notice: Subject to any disclaimer, the term of this patent is extended or adjusted under 35 U.S.C. 154(b) by 319 days.

(21) Appl. No.: 16/078,479

(22) PCT Filed: May 29, 2017

(86) PCT No.: PCT/JP2017/019847
§ 371 (c)(1),
(2) Date: Aug. 21, 2018

(87) PCT Pub. No.: WO2017/212962
PCT Pub. Date: Dec. 14, 2017

(65) Prior Publication Data
US 2019/0048909 A1    Feb. 14, 2019

(30) Foreign Application Priority Data

Jun. 8, 2016  (JP) .............................. JP2016-114015

(51) Int. Cl.
*F16B 5/02* (2006.01)
*F16C 11/04* (2006.01)
*F16B 39/12* (2006.01)

(52) U.S. Cl.
CPC ................ *F16B 5/02* (2013.01); *F16B 39/12* (2013.01); *F16B 39/128* (2013.01); *F16C 11/04* (2013.01); *F16B 5/0266* (2013.01)

(58) Field of Classification Search
CPC ...... F16B 39/12; F16B 39/128; F16B 5/0266; F16B 5/02; F16B 39/284; F16C 11/04; Y10S 411/931
See application file for complete search history.

(56) References Cited

U.S. PATENT DOCUMENTS

| 897,168 | A | * | 8/1908 | Smith | ..................... | F16B 39/12 |
| | | | | | | 411/222 |
| 1,627,745 | A | * | 5/1927 | Madden | ................ | F16B 39/128 |
| | | | | | | 411/238 |

(Continued)

FOREIGN PATENT DOCUMENTS

| EP | 65414 A1 * 11/1982 | |
| EP | 1054171 A2 * 11/2000 | .......... F16B 37/0892 |

(Continued)

OTHER PUBLICATIONS

International Search Report dated Aug. 22, 2017.

*Primary Examiner* — Matthew R McMahon
(74) *Attorney, Agent, or Firm* — Wood, Phillips, Katz, Clark & Mortimer

(57) ABSTRACT

A pivot-mounting device has a lower nut (4) is fixing a bolt (2) to an object (A), and an upper nut (3) having a boss (32) rotatably supporting a rotatable member (B) is tightened on the bolt (2). A lower nut (4) includes an engagement recess (41) into which the boss (32) can be fitted with the outer peripheral surface of the boss (32) and the inner peripheral surface of the engagement recess (41) each being a straight cylinder shape. The boss outer peripheral surface (32) is slightly eccentric relative to a female thread hole (3a).

2 Claims, 4 Drawing Sheets

(56) References Cited

U.S. PATENT DOCUMENTS

| | | | | |
|---|---|---|---|---|
| 2,301,634 | A * | 11/1942 | Nicholay | F16B 39/128 |
| | | | | 411/238 |
| 5,919,018 | A * | 7/1999 | Chuang | F16B 39/128 |
| | | | | 411/149 |
| 6,609,867 | B2 * | 8/2003 | Wakabayashi | F16B 39/128 |
| | | | | 411/14 |
| 2016/0131173 | A1 * | 5/2016 | Shirayanagi | B21D 22/02 |
| | | | | 411/277 |

FOREIGN PATENT DOCUMENTS

| | | | |
|---|---|---|---|
| JP | 58-203210 A | | 11/1983 |
| JP | 08-270636 A | | 10/1996 |
| JP | 2000104376 A | * | 4/2000 |
| JP | 2008-014402 A | | 1/2008 |
| JP | 2011-017352 A | | 1/2011 |

* cited by examiner

ATTACHMENT DEVICE

TECHNICAL FIELD

The present invention relates to an attachment device that can be used for attaching various parts, preferably attaching rotatable parts.

BACKGROUND ART

A variety of arrangements for pivotably mounting a rotatable member or arrangements for attaching other various members are known.

SUMMARY OF THE INVENTION

Problems to be Solved by the Invention

An object of the present invention is to provide a novel pivot-mounting device and an attachment device that can accommodate various thicknesses of members and facilitate repeated attachment and detachment and that can prevent loosening due to vibration.

Means for Solving the Problems

The present invention provides a pivot-mounting device for rotatably attaching a rotatable member to an object to which the member is to be attached.

A pivot-mounting device of the present invention includes: a bolt; and first and second nuts having female thread holes into which the bolt is screwable, wherein the first nut includes a first support surface capable of supporting a first side of the rotatable member and a boss axially protruding from the first support surface toward the second nut for rotatably holding the rotatable member, and wherein the second nut includes a second support surface capable of supporting a second side of the rotatable member opposite to the first side, and an engagement recess provided in the second support surface into which the boss is fittable.

Further, an outer peripheral surface of the boss is eccentric relative to the female thread hole of the first nut or an inner peripheral surface of the engagement recess is eccentric relative to the female thread hole of the second nut such that, when the boss is fitted into the engagement recess, a circumferential portion of the outer peripheral surface of the boss engages a circumferential portion of an inner peripheral surface of the engagement recess such that, in each of the first and second nuts, a pressing force in a direction perpendicular to an axis thereof is produced.

The present invention is characterized in that each of the outer peripheral surface of the boss and the inner peripheral surface of the engagement recess is formed into a straight circular shape such that the pressing force is produced even when a fit depth of the boss with respect to the engagement recess changes in a predetermined range.

The pivot-mounting device of the present invention is used in the following manner: First, one of the first and second nuts (hereinafter referred to as "early-mounted nut") is used to fasten the bolt to the object. Typically, the bolt is inserted into an attachment hole provided in the object from one of its ends as determined along the axial direction and the early-mounted nut is threadably mounted on the bolt from the other end along the axial direction to be tightened such that the object is sandwiched by the bolt head and the early-mounted nut on both ends along the axial direction to achieve attachment. At this time, the centripetalism of the female thread on the early-mounted nut and the male thread of the bolt ensures that, even if a fit clearance is provided between the female thread hole and the bolt, the female thread hole of the early-mounted nut is concentric with the bolt without a shift of its axis.

Next, when the other nut (hereinafter referred to as "late-mounted nut") is threadably mounted on the bolt, the boss of the first nut is fitted into the engagement recess of the second nut and a circumferential portion of the outer peripheral surface of the boss engages a circumferential portion of the inner circumferential surface of the engagement recess such that pressing forces, i.e. mutual reaction forces, in a direction perpendicular to the axis are produced in the first and second nuts. These pressing forces cause the late-mounted nut to be slightly eccentric relative to the axis of the bolt by the amount of the fit clearance such that the female thread of the late-mounted nut is twisted relative to the male thread of the bolt, thereby achieving an anti-loose effect. Since the pressing forces and the anti-loose effect prevent loosening of the late-mounted nut, the position at which tightening of the late-mounted nut is completed as represented by the fit depth of the boss with respect to the engagement recess may be any position in a predetermined range, and thus the distance between the first and second support surfaces may be changed appropriately depending on the thickness of the rotatable member and/or the attachment configuration of the rotatable member, for example.

In the pivot-mounting device of the present invention, the rotatable member may be directly supported, in an abutting manner, by the first and second support surfaces; alternatively, an elastic body for biasing the rotatable member in an axial direction may be mounted on the outer periphery of the boss, where the first or second support surface may support the rotatable member via the elastic body.

Alternatively, the rotatable member may be attached to the boss via a bearing; specifically, an inner wheel of the bearing may be attached to the outer periphery of the boss and the inner wheel may be fixed between the first and second support surfaces. Then, an outer wheel of the bearing may be fixed to the rotatable member to significantly reduce the rotational resistance of the rotatable member. In this case, the bearing including the inner wheel forms part of the rotatable member, and a first side of the inner wheel of the bearing of this rotatable member is supported by the first nut and a second side is supported by the second nut.

In the outer peripheral surface of the boss and the inner peripheral surface of the engagement recess, each of the engaging circumferential portions is suitably formed into a straight cylinder shape, and the other portions may have any shape or structure as long as they do not protrude in the radial direction relative to those circumferential portions.

The present invention is not limited to a rotatable member, but may be carried out as an attachment device for attaching and fixing a plate member or any other member to an object. That is, the present invention may be an attachment device for attaching a member to an object to which the member is to be attached, including: a bolt; and first and second nuts having female thread holes into which the bolt is screwable, wherein the first nut includes a first support surface capable of supporting a first side of the member and a boss axially protruding from the first support surface toward the second nut for holding the member, wherein the second nut includes a second support surface capable of supporting a second side of the member opposite to the first side, and an engagement recess provided in the second support surface into which the boss is fittable, wherein an outer peripheral surface of the boss is eccentric relative to the female thread hole of the first nut or an inner peripheral surface of the engagement recess is eccentric relative to the female thread hole of the second nut such that, when the boss is fitted into the engagement recess, a circumferential portion of the outer peripheral surface of the boss engages a circumferential portion of an inner peripheral surface of the engagement recess such that, in each of the first and second nuts, a pressing force in a direction perpendicular to an axis thereof is produced, characterized in that each of the outer peripheral surface of the boss and the inner peripheral surface of the engagement recess is formed into a straight cylinder shape such that the pressing force is produced even when a fit depth of the boss with respect to the engagement recess changes in a predetermined range.

Effects of the Invention

The present invention provides a simple configuration that is easy to use repeatedly and still accommodates changes in the thickness (i.e. axial dimension) of the rotatable member and various attachment configurations to prevent loosening.

EMBODIMENTS FOR CARRYING OUT THE INVENTION

Figure 1:
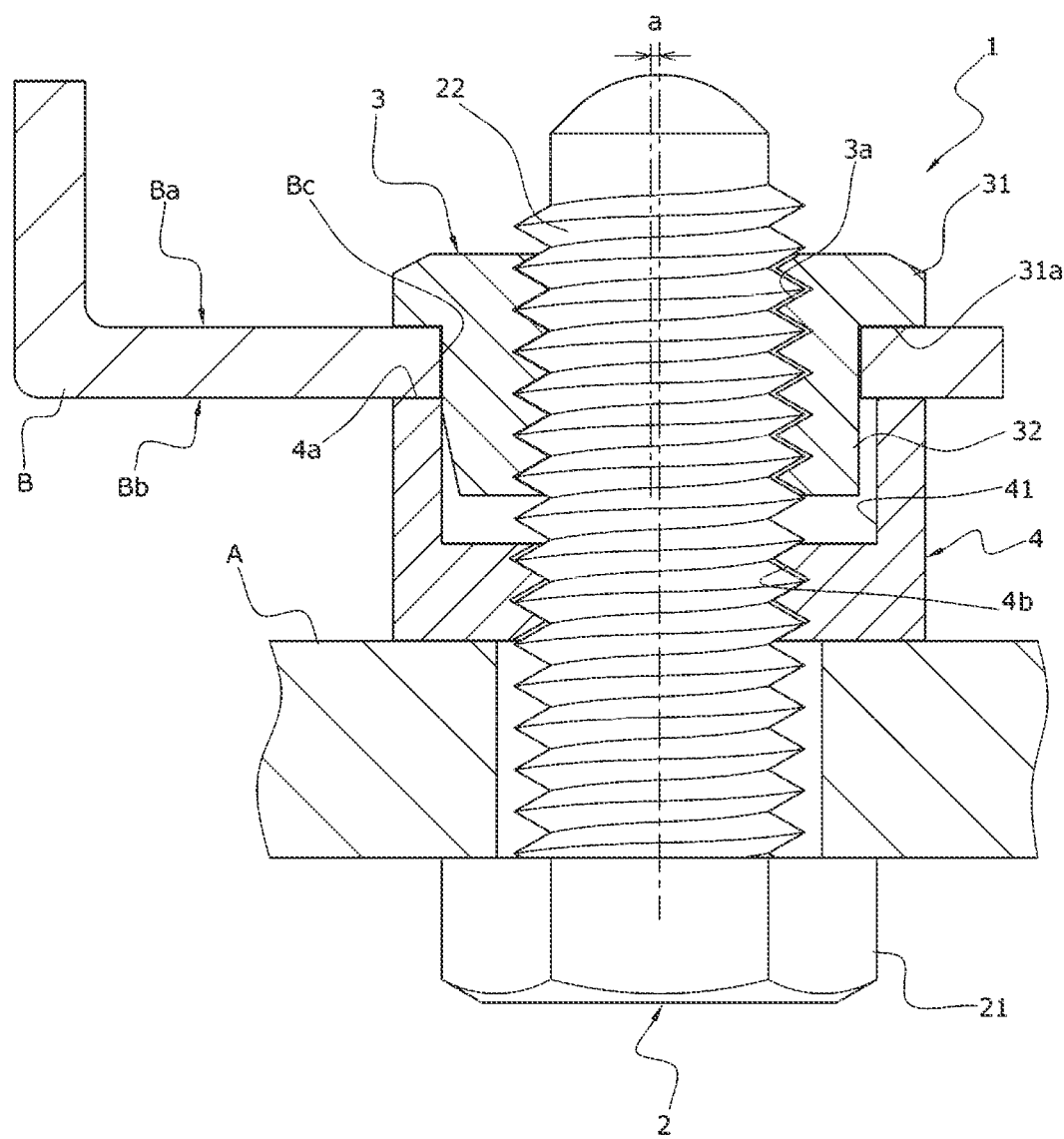
FIG. 1 is a cross-sectional view of a pivot-mounting device according to an embodiment of the present invention.
Figure 2:
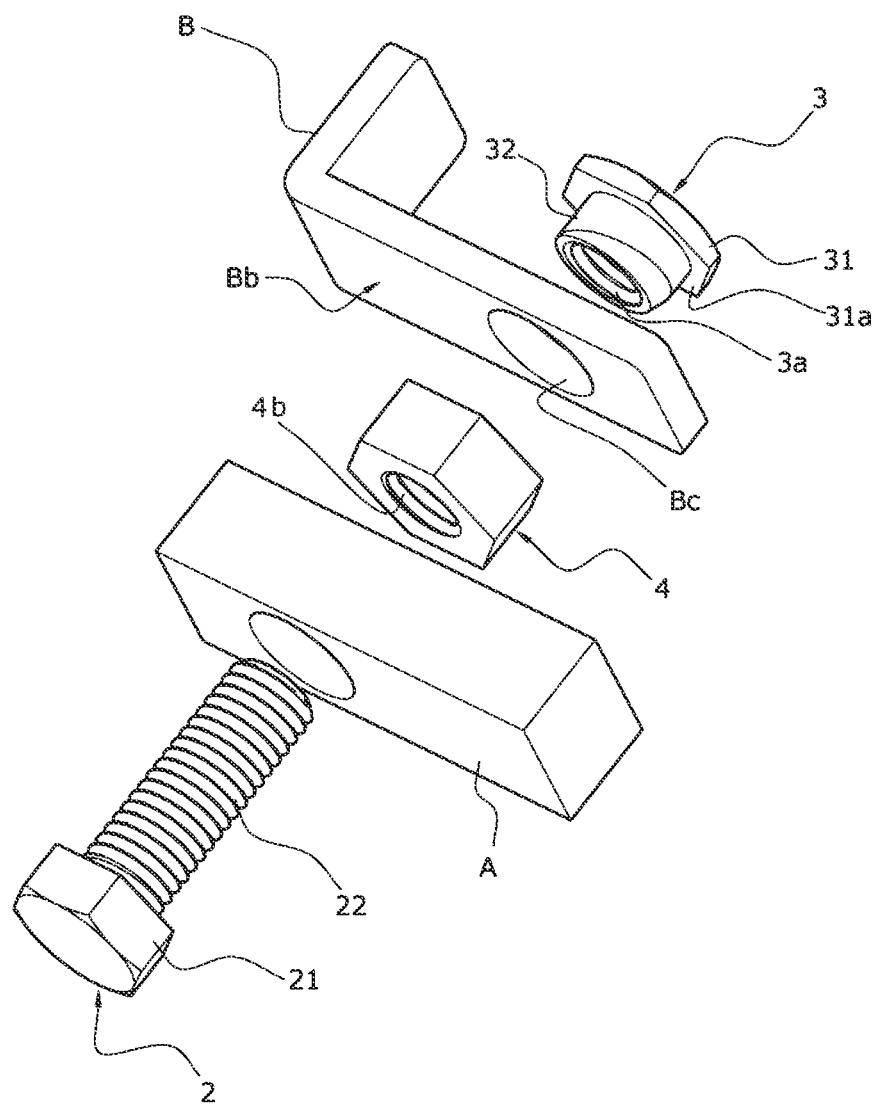
FIG. 2 is an exploded perspective view of the pivot-mounting device.

FIGS. 1 and 2 show a pivot-mounting arrangement that uses a pivot-mounting device 1, i.e. attachment device, according to an embodiment of the present invention to rotatably attach an L-shaped rotatable member B to an object to which the member is to be attached, A.

The pivot-mounting device 1 according to the present embodiment includes a bolt 2, and first and second nuts 3 and 4 having female thread holes 3a and 4b into which the bolt 2 is screwable, where the first and second nuts 3 and 4 provide a double-nut configuration.

The bolt 2 includes a bolt head 21 shaped as a hexagonal column, and a bolt shaft 22 protruding from the bolt head 21. A male thread is formed on the outer peripheral surface of the bolt shaft 22.

The first nut 3 includes a flange 31 having a hexagonal cross section and a boss 32 having a cylindrical cross section, the boss protruding in an axial direction from a facing side 31a of the flange 31 that faces the second nut 3, toward the second nut 3. The facing side 31a of the flange 31 serves as a first support surface for supporting a first side Ba of the rotatable member B. The boss 32 is inserted into an attachment hole Bc formed in the rotatable member B to rotatably support the rotatable member B. The outer peripheral surface of the boss 32 is formed into a straight cylinder shape and is slightly eccentric relative to the female thread hole 3a. Further, as also shown in FIG. 2, a taper surface is provided on the outer periphery of an end portion of the boss 32 for guiding the boss into the engagement recess 41, described below, to enable engagement. In the embodiment shown, the taper surface is concentric with the female thread hole 3a, that is, the taper surface is eccentric relative to the outer periphery of the boss 32; alternatively, the taper surface may be concentric with the outer periphery of the boss.

The second nut 4 is shaped as a hexagonal nut, and a facing side 4a that faces the first nut 3 serves as a second support surface for supporting a second side Bb of the rotatable member B opposite to the first side. The second nut 4 includes an engagement recess 41 provided in the second support surface 4a into which the boss 32 of the first nut 3 can be fitted. The depth of the engagement recess 41 is substantially equal to the protrusion height of the boss 32. The inner peripheral surface of the engagement recess 41 is shaped as a straight cylinder and concentric with the female thread hole 4b.

The inner diameters of the female thread holes 3a and 4b of the first and second nuts are slightly larger than the outer diameter of the male thread of the bolt 2, thus providing a fit clearance.

In the pivot-mounting configuration shown in FIG. 1, first, the second nut 4 is strongly tightened such that the second nut 4 and the bolt head 21 of the bolt 2 sandwich the object A to secure the bolt 2 to the object A. The male thread of the bolt 2 and the female thread hole 4b of the nut 4 in this secured state are in such a relationship that the flank of the male thread of the bolt 2 that faces the base end, i.e. downward in the drawing, represents the pressure-side flank while the flank that faces the tip, i.e. upward in the drawing, represents the clearance-side flank, and, as the nut 4 is tightened, the axis of the bolt 2 becomes generally aligned with the axis of the female thread hole 4b and the nut 4 and bolt 2 are completely fixed in the axial direction. Alternatively, the first nut 3 may be fitted into the second nut 4 in advance to enable tightening of the second nut 4 on the bolt 2 in a slightly eccentric manner.

Next, the boss 32 of the first nut 3 is inserted into the attachment hole Bc in the rotatable member B from above in the drawing, and the portion of the boss protruding downward from the attachment hole Bc is fitted into the engagement recess 41 of the second nut 4 and pushed in until a circumferential portion of the outer peripheral surface of the boss 32 shaped as a straight cylinder, i.e. side toward the direction of eccentricity, engages a circumferential portion of the inner peripheral surface of the engagement recess 41. It is preferable to adjust the amount of tightening of the first nut 3 to such a level that the first and second support surfaces 31a and 4a do not tightly sandwich and fix the fixed member.

At this time, a circumferential portion of the outer peripheral surface of the boss 32 engages a circumferential portion of the inner peripheral surface of the engagement recess 41 to produce pressing forces in a direction perpendicular to the axis of the first and second nuts 3 and 4 to cause the first nut 3 to slightly move in the direction opposite to the direction of eccentricity of the boss, or to the right in the drawing, and both flanks of the male thread of the bolt 2 are pressed onto both flanks of the female thread of the first nut 3 in the circumferential portion at the eccentricity side of the boss, thereby producing a large friction resistance between the flanks of the male thread and the flanks of the female thread.

Since the outer peripheral surface of the boss 32 and the inner peripheral surface of the engagement recess 41 are each shaped as a straight cylinder, pressing forces in a direction perpendicular to the axis, discussed above, are produced in both nuts 3 and 4 even when the fit depth of the boss 32 with respect to the engagement recess 41 changes, as long as the outer peripheral surface and inner peripheral surface of the straight cylinders engage; as such, even for different plate thicknesses of the rotatable member B, using the support surfaces 31*a* and 4*a* to support the rotatable member B from both sides as determined along the axial direction prevents the rotatable member B from being displaced and the boss 32 rotatably supports the rotatable member.

Figure 3:
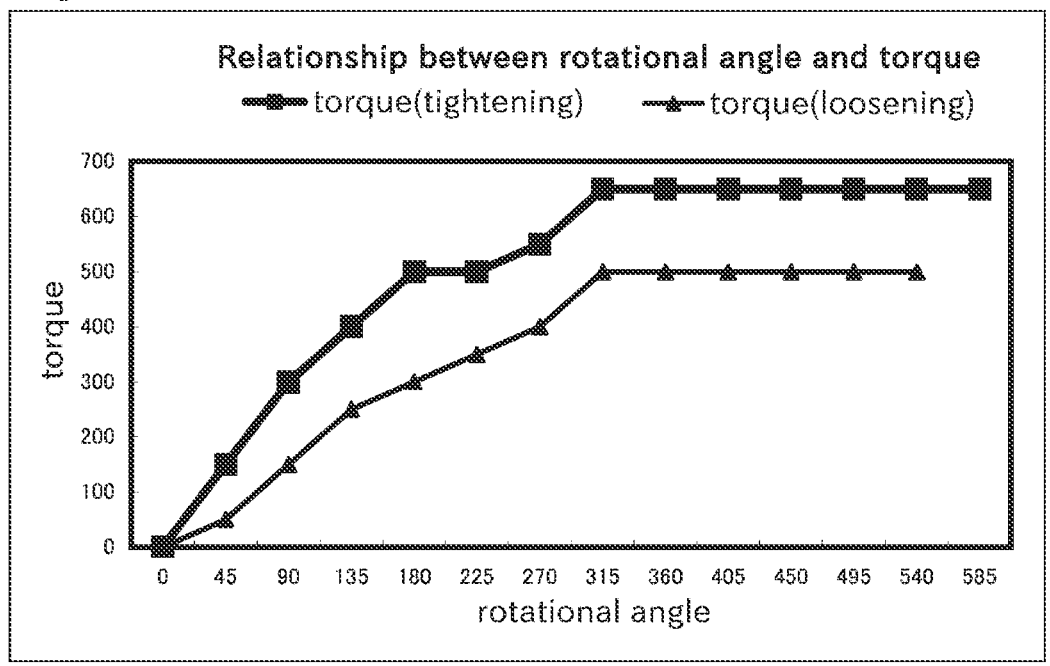
FIG. 3 is a graph illustrating effects of the pivot-mounting device.

FIG. 3 is a graph illustrating how tightening torque transitioned when a test sample fabricated by the applicant of the present application was used to tighten the first nut 3, and how tightening torque transitioned when the tightened first nut 3 was loosened. When the point at which the taper surface of the end of the boss 32 first engaged the engagement recess 41 in an abutting manner is treated as the rotational angle of 0°, it can be seen that torque increased as the taper surface entered the engagement recess 41. At the rotational angle of 315°, the entire taper surface was within the engagement recess 41 and, thereafter, the outer peripheral surface of the straight cylinder formed by the boss 32 slid on the inner peripheral surface of the straight cylinder formed by the engagement recess 41 in an axial direction; as a result, tightening torque was generally stable after the rotational angle of 315°, which means that the pressing forces in both nuts 3 and 4 in a direction perpendicular to the axis were generally stable.

Figure 4:
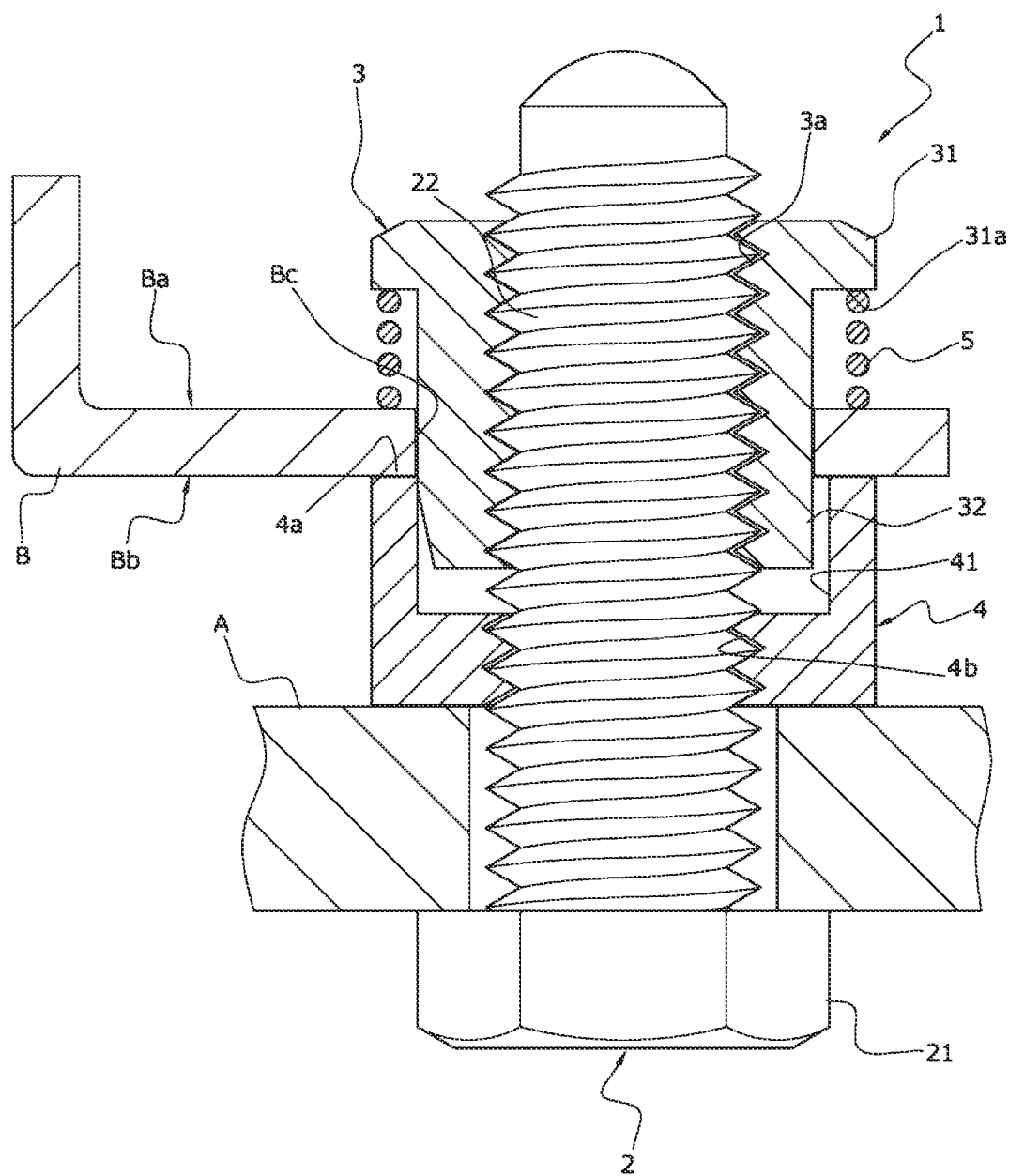
FIG. 4 is a cross-sectional view of a pivot-mounting device according to another embodiment of the present invention.

Alternatively, as shown in FIG. 4, an elastic body 5, such as a spring, for biasing the rotatable member B in an axial direction may be mounted on the outer periphery of the boss 32 such that the first support surface 31*a* supports the rotatable member B via the elastic body 5. Alternatively, a similar elastic body may be provided between the first support surface 4*a* and rotatable member.

Further, in the above-described embodiment, the outer peripheral surface of the boss is eccentric relative to the female thread hole of the first nut; alternatively, the inner peripheral surface of the engagement recess may be eccentric relative to the female thread hole of the second nut. Further, the above-described embodiment illustrates an implementation in which the second nut is used to fix the bolt before the first nut is attached; alternatively, first, the first nut may be used to fix the bolt, and the rotatable member may then be mounted on the outer periphery of the boss of the first nut before the second nut is fastened.

In the above-described embodiment, the first and second nuts 3 and 4 are used to pivotably mount a rotatable member; alternatively, the first and second nuts 3 and 4 may be used to attach and fix any member other than a rotatable member to an object A, in which case, too, the amount of tightening of the first nut 3 may be adjusted to accommodate changes in the plate thickness or other parameters of the member.

The invention claimed is:

1. An attachment device for rotatably attaching a member (B) to an object (A), comprising:
   the member (B);
   the object (A);
   a bolt (2); and
   first and second nuts (3, 4) having female thread holes (3*a*, 4*b*) into which the bolt (2) is screwable,
   wherein the bolt (2) is fastened to the object (A) by using one of the first and second nuts (3, 4);
   the other nut is adapted to threadably mount on the bolt (2) after the bolt (2) is fastened to the object (A) by using the one nut;
   the first nut (3) includes a first support surface (31*a*) capable of supporting a first side of the member (B) and a boss (32) axially protruding from the first support surface (31*a*) toward the second nut (4) for rotatably holding the member (B);
   the second nut (4) includes a second support surface (4*a*) capable of supporting a second side of the member (B) opposite to the first side, and an engagement recess (41) provided in the second support surface (4*a*) into which the boss (32) is fittable;
   an outer peripheral surface of the boss (32) is eccentric relative to the female thread hole (3*a*) of the first nut (3) or an inner peripheral surface of the engagement recess is eccentric relative to the female thread hole of the second nut such that, when the boss (32) is fitted into the engagement recess (41), a circumferential portion of the outer peripheral surface of the boss (32) engages a circumferential portion of an inner peripheral surface of the engagement recess (41) such that, in each of the first and second nuts (3, 4), a pressing force in a direction perpendicular to an axis thereof is produced; and
   each of the outer peripheral surface of the boss (32) and the inner peripheral surface of the engagement recess (41) in engagement with each other is formed into a straight cylinder shape such that a constant tightening torque is produced in the first nut (3) by the pressing force even when a fit depth of the boss (32) with respect to the engagement recess (41) changes in a predetermined range.

2. The attachment device according to claim 1, wherein an elastic body (5) for biasing the member in an axial direction is mounted on an outer periphery of the boss and the first or second support surface supports the member via the elastic body.

\* \* \* \* \*